United States Patent [19]

Anderson et al.

[11] Patent Number: 5,158,326
[45] Date of Patent: Oct. 27, 1992

[54] CASING HEAD CONNECTOR

[75] Inventors: Alfred L. Anderson, Spring; Christopher G. Sanchez, Houston, both of Tex.

[73] Assignee: Cooper Industries, Inc., Houston, Tex.

[21] Appl. No.: 377,632

[22] Filed: Jul. 7, 1989

[51] Int. Cl.$^5$ .......................................... F16L 37/092
[52] U.S. Cl. ........................................ 285/3; 285/18; 285/145; 285/917; 285/93
[58] Field of Search ........................ 285/145, 920, 3, 4, 285/917, 18, 93, 3, 331, 144-148

[56] References Cited

U.S. PATENT DOCUMENTS

| | | | |
|---|---|---|---|
| 2,761,704 | 9/1956 | Crawford | 285/331 |
| 3,130,987 | 4/1964 | Johnson | 285/146 |
| 3,711,123 | 1/1973 | Arnold | 285/145 X |
| 4,006,921 | 2/1977 | Mohr | 285/3 X |
| 4,109,940 | 8/1978 | Reneau | 285/18 |
| 4,650,225 | 3/1987 | Le | 285/920 X |
| 4,720,125 | 3/1988 | Reneau | 285/18 |

*Primary Examiner*—Dave W. Arola
*Attorney, Agent, or Firm*—William E. Shull; David A. Rose; Nelson Blish

[57] ABSTRACT

A pipe connector including a main body having a stepped bore in one end for telescopic insertion over the end of a pipe, creating a stepped annular area around the pipe. A slip retaining nut is threaded into the end of the main body around the pipe, closing off the stepped annular area. Slips are carried in a tapered annular space between the nut and pipe. Prior to actuation, the slips are held up in disengaged position by shear pins. A pair of metal seal rings is disposed in the end of the stepped annular area opposite the nut. A pair of dual-acting, hydraulically actuated pistons is disposed in the stepped annular area between the metal seal rings and slips. Hydraulic pressure actuates the upper piston to move upwardly to energize the metal seals, and the lower piston to move downwardly to actuate the slips into gripping engagement with the pipe. Floating, self-centering lock ring segments are wedged between the pistons by lockdown screws to prevent the pistons from backing out of energizing engagement with the metal seal rings and slips. The connector may be released by backing out the lockdown screws which retracts the lock ring segments, unscrewing the slip retaining nut and removing it and the slips, pulling out the lower and upper pistons, and sliding the main body off the pipe. The metal seals may then be replaced along with the elastomer seals or slips, as needed.

19 Claims, 4 Drawing Sheets

CASING HEAD CONNECTOR

BACKGROUND OF THE INVENTION

The present invention relates generally to pipe connectors and, more particularly, to a connector which may be used, for example, to attach a head member or other fitting to the end of a joint of pipe, or to connect together the ends of two joints of pipe. The present invention is particularly useful in the production of petroleum products, as a means of connecting a casing head to the top of a string of surface casing in the wellhead of an oil or gas well.

In a typical completion of a conventional oil or gas well, a string of conductor pipe is driven or drilled into the earth, and a landing base is installed at the upper end of the conductor pipe. The hole for the surface casing is then drilled through the conductor pipe. The surface casing is run into the hole and cemented in place, and a casing head is installed on top of the surface casing, on the landing base. Successively smaller diameter and deeper holes are then drilled for one or more successively smaller diameter but longer intermediate casing strings, down to the oil string casing, and these casings are in turn run into the wellbore, cemented, and suspended in the wellhead. The next smaller size casing from the surface casing is typically suspended from hanger equipment in the surface casing head, and successively smaller casing strings are typically suspended from hanger equipment in separate casing spools or heads installed on top of the surface casing head. Then, after all casings are in place, a similar procedure is followed for the tubing head and tubing strings. Each time a new one of the separate heads is installed, the blowout preventer equipment, which is in place during drilling operations, is removed, leaving the hole exposed and unprotected from blowouts or other hazardous conditions until the new head is installed and the blowout preventer stack reinstalled or replaced. Thus, it is important to install the heads, including the surface casing head, as quickly as possible in order to minimize the possibility of a dangerous and potentially catastrophic blowout.

In the past, the surface casing head of an oil or gas well has generally been either threaded onto the top of the surface casing, or welded to it. Both welded and threaded connections, although simple and usually reliable, often cause difficulties requiring costly equipment repair or resulting in lost rig time, which for highly expensive rig crews and equipment can amount to a prohibitive expense. Welds can crack or otherwise fail, and usually require pre-heating, post-heating and/or stress relief, any of which operations are susceptible of being improperly performed. Welding is relatively time-consuming, and field welds may be unduly interruptive of drilling or production operations. Moreover, welding requires surface preparation beforehand and post-weld cleanup and other operations, all of which result in diminished effective drilling or production time.

Threaded connections are sometimes inadequately or improperly made up, either too loose or too tight. Cross-threading may also occur, resulting not only in an improperly made up joint, but also in thread damage in the casing head or surface casing. Threads on the head or the pipe may also be damaged in transit, storage, or handling on the rig floor. Furthermore, when a threaded connection is used, the distance the last joint of surface casing extends above the landing base is important, and must be determined with some care and proper planning. A miscalculation might result in the casing extending above the landing base a distance which is insufficient for full engagement of the connection.

One approach to avoiding these problems of welded or threaded connections has been proposed by Cameron Iron Works of Houston, Tex., with its Camforge wellhead system. In the Camforge system, after the surface casing has been installed in the wellbore and cut off above the landing base, a wellhead housing is lowered over the top of the surface casing and onto the landing base. A special hydraulic forge tool is lowered into the casing and pressured up, expanding the casing beyond yield into grooves machined in the housing and stressing the housing to near its yield strength. After the pressure is released, the housing contracts against the casing, affixing the housing to the casing and forming a metal-to-metal seal. This system, however, has its own attendant problems which detract from its desirability as a solution to the problems of welded and threaded connections. The Camforge system requires special machining in the head or housing to provide the shaped grooves into which the casing expands. The forging process which expands the casing places so much stress on the casing and housing that damage to the casing or housing can result, especially if there are any defects in the metal structure of the casing or housing. This system also requires use of a special forging tool and pump which, if either were to malfunction, might result in an inadequately made up connection or damage to the casing, housing, or rig. In addition, once installed, the wellhead housing cannot easily be removed from the casing, so the housing cannot easily be reused.

Another system which has been proposed to overcome the problems of the welded and threaded connections referred to above is the Quick Lock system of McEvoy in Houston, Tex. In that system, the casing head is lowered over the end of the surface casing until it abuts the top of the casing. Slips in the head are held in the upper or released position by one of two sets of screws. Once the casing head has landed, a second set of screws is used to lower and actuate the slips into engagement with the casing. Normally, the McEvoy Quick Lock system is used as a tieback connector where it is necessary to lower another length of pipe and connect it to the stub of an existing pipe. One major deficiency of the McEvo system is that the slips cannot be unset. Thus, once the slips are actuated, the head cannot be easily removed from the casing and reused.

There are other circumstances in addition to that of attaching a surface casing head to a surface casing string where threaded or welded connections for pipes are either inappropriate or unavailable. For example, when it is desired to attach a flange or other fitting to a pipe stub, be it part of an oil or gas production system or other piping system, it may not have a thread on or into which a threaded connection member can be installed. Welding may be impractical or impossible due to the nature of the environment surrounding the pipe stub, or the type of material of which the stub is made. In addition, in some situations it might not be possible to use alternative connection means such as the Cameron Camforge or McEvoy Quick Lock systems, such as, for example, in situations in which quick removal of the connector from the pipe is or may be necessary.

There are also circumstances which arise in which it is desired to join together the free ends of two pieces or joints of pipe, or to repair a broken pipe. As in the case of the pipe stub discussed above, welding, threading, or other means such as the Camforge or Quick Lock systems may not be available or appropriate to connect the pipe ends together.

It is an object of the present invention to provide a simple, reliable, durable, and effective pipe connection system which overcomes the problems of the prior art pipe connection devices and methods discussed above. It is also an object of the present invention to provide such a pipe connection system which is easily disconnected from the pipe or pipes to which it is attached. It is another object of the present invention to provide such a pipe connection system which may be easily reenergized in service. A further object of the present invention is to provide such a pipe connection system which utilizes leakproof metal-to-metal seals and positive gripping means.

It is an additional object of the present invention to provide a pipe connection system which requires no pre-heating, post-heating and/or stress relief, or special surface preparations or treatments of the pipe or pipes in order to effect a sealed, tight, releasable connection. Another object of the present invention is to provide such a pipe connection system which does not require specialized tools for installing and energizing the connector(s).

A further object of the present invention is to provide a connection system as described above which may be used rapidly and efficiently to securely attach a casing head to a surface casing string at a wellhead of an oil or gas well. Another object of the present invention is to provide such a connection system whereby upon cutting off the casing string below the landing base, the landing base and the casing head may be easily disconnected from the section of casing to which they are attached, and reused. A still further object of the present invention is to provide such a connection system which permits greater tolerance than with threaded connectors concerning the distance above the landing base which the top of the last joint of surface casing protrudes in order to effect a fully made up connection.

Additionally, it is an object of the present invention to provide a connection system as described above which may be used to securely and releasably attach a flange or other fitting to a pipe stub, or connect together two free ends of two joints of pipe, or repair a broken pipe.

It is a still further object of the present invention to provide such a pipe connection system which is easy to manufacture, and inexpensive.

SUMMARY OF THE INVENTION

The present invention accomplishes the objectives set forth above by providing a pipe connection system including a main body having one end adapted for telescopic insertion over the end of a pipe. If used to conduct fluid flow, the main body may have a central axial bore which is coaxial with the pipe bore when installed thereon. Otherwise, the main body may be a solid member, for example when used as a plug or cap. The main body has a stepped bore, i.e., one which comprises a plurality of counterbores, in the end which receives the pipe, providing a correlatively shaped annular area around the end of the pipe between the outside wall of the pipe and the counterbore walls. A slip retaining nut is threaded into the end of the main body around the pipe, substantially closing off the stepped annular area around the pipe. A set of slips is carried in a tapered annular space between the radially inside wall of the nut and the outside wall of the pipe. Prior to actuation of the connector, the slips are held away from the pipe in a disengaged position by shear pins disposed between the slips and the tapered inside wall of the slip retaining nut.

A Canh seal comprising a pair of metal seal rings is disposed around the pipe at the end of the stepped annular area opposite the slip retaining nut for sealing between the main body and the pipe. A pair of dual-acting, hydraulically actuated pistons is disposed in the stepped annular area between the Canh metal seal rings and the slip retaining nut and slips. When actuated by application of hydraulic pressure, the upper piston moves upwardly and actuates the Canh seal into metal-to-metal sealing engagement between the main body and pipe, and the lower piston moves downwardly to shear the shear pins and actuate the slips into gripping engagement with the pipe.

A plurality of lock ring segments are disposed radially outwardly of and in surrounding engagement with both the upper and lower pistons. The lock ring segments are actuated by lockdown screws into wedging engagement between the pistons to prevent them from moving out of fully actuating engagement with the metal seal rings and slips. The lock ring segments thus provide a mechanical backup for the hydraulic actuating means, for example if hydraulic pressure on the pistons is released. The lock ring segments each have a T-shaped retaining slot for receiving a correlatively shaped head on the lockdown screws such that the lock ring segments are free to move longitudinally axially of the pipe connector to a limited extent. The T-shaped slots and heads permit the lock ring segments to be backed out of wedging engagement with the pistons when the lockdown screws are unscrewed or backed off. Each lock ring segment is beveled around its upper and lower inner periphery, and the faces of the upper and lower pistons which engage the lock ring segments are correlatively tapered. The lock ring segments are free to float axially of the connector and are thus self-centering with respect to the upper and lower pistons when actuated.

In the event that either or both the slips or the seal rings become loose or lose some of their energization, the connector can easily be re-energized by reapplying hydraulic pressure to move the pistons further into engagement with the metal seals and slips, and retightening the lockdown screws.

In the event it becomes necessary or desirable to remove the connector from the pipe, hydraulic pressure is released, the lockdown screws are backed out, pulling the lock ring segments out with them, and the slip retaining nut is unscrewed from the end of the main body. When the nut is backed off, the slips are released and drop out with the nut. If used as a connector for a casing head on a string of surface casing, the casing will typically be cut off below the landing base, and the casing head, landing base, and top section of casing are removed from the well. The landing base will slide off, permitting the slip retaining nut to be backed off. Cutting the pipe will not always be necessary in order to back off the nut; for example, when the connector is used as a union between the ends of two pipes, usually no cutting will be necessary to back off the nuts. After the nut and slips are removed, the lower piston is engaged from below and pulled down and out of the main body. The upper piston is similarly engaged from below and pulled out of the main body. The Canh seals are extracted, and the connector is removed from the pipe. The connector may then be refurbished, including replacement as needed of the Canh seals, elastomer piston seals, or slips for reinstallation on a pipe.

If connection between two pipe ends or repair of a broken pipe is desired, the connector will have a main body and two sets of slip retaining nuts, slips, pistons, Canh seals, lock ring segments, and lockdown screws, with one set at each end of the main body, to form a union. Repair of a broken pipe may require a section of pipe to be cut away to leave room for insertion of the connector of the invention between the ends of the pipe segments at the cut.

The main body has a downwardly and outwardly facing, downwardly and inwardly tapering frustoconical shoulder at the end of the stepped annular area in engagement around its inner peripheral edge with the upper, inner peripheral edge of the pipe for preventing inward collapse of the pipe when subjected to high compressive loading, for example during drilling operations with the weight of the blowout preventer stack on top of the head, or when additional casing strings are installed and supported in the wellhead on top of the head. The shoulder deforms plastically, and pushes radially outwardly on the upper inner edge of the pipe to resist inward collapse of the pipe.

BRIEF DESCRIPTION OF THE DRAWINGS

The above-described features and advantages of the present invention will be apparent from the following detailed description, read in conjunction with reference to the following drawings wherein.

DETAILED DESCRIPTION OF THE PREFERRED EMBODIMENT OF THE INVENTION

Figure 1:
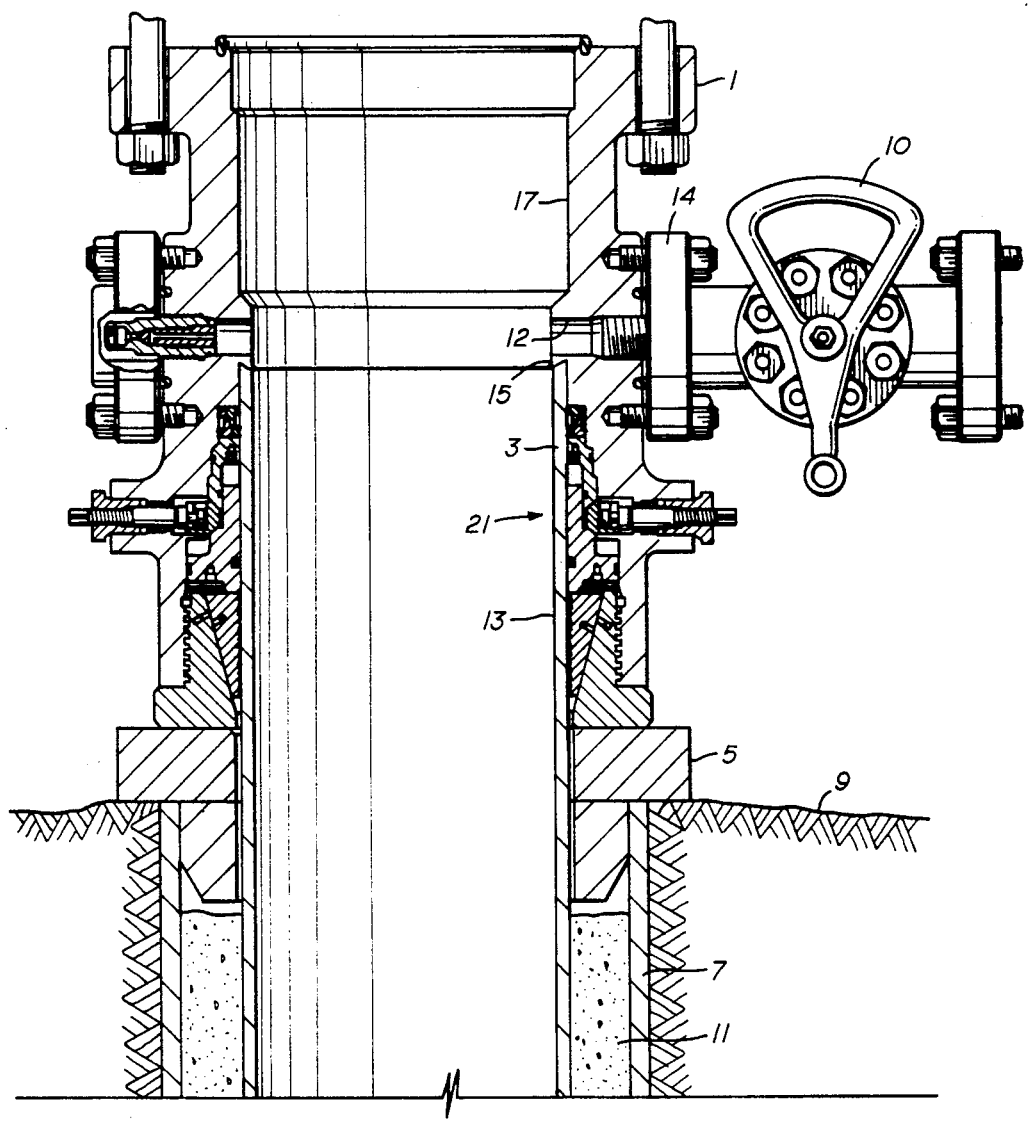
FIG. 1 is a view illustrating a portion of a wellhead of an oil or gas well, which is a typical environment for use of the present invention, including a vertical cross-sectional view of a casing head installed on top of a surface casing string using a pipe connector of the present invention.

Referring now to FIG. 1, there is shown in vertical cross-section a portion of a wellhead of an oil or gas well, including a casing head 1 installed on top of a string of surface casing 3. Casing head 1 rests upon a landing base 5 mounted at the top of a string of conductor pipe 7 drilled, driven, or otherwise installed in the earth 9. Casing 3 is cemented in the wellbore by a column of cement 11, and is suspended in casing head 1 by use of the connector of the present invention, indicated generally at 21. Casing 3 has a bore 13 which is coaxial with bore 15 of casing head 1. A valve lo is mounted on a side outlet 12 of head 1 with flange 14 for controlling fluid flow through the outlet. Successively smaller diameter but longer casing strings are installed in the well, cemented, and suspended from the wellhead shown in FIG. 1 with the addition of casing heads and/or spools on top of head 1. The smaller casing strings are suspended from hanger equipment in head 1 and the additional heads and/or spools mounted thereon, down to the oil string casing. The next size smaller casing from surface casing 3 is suspended from hanger equipment (not shown) supported in bore portion 17 of head 1. When all the casing strings have been installed, a tubing head or spool is mounted on the top of the casing head stack, and a tubing string or strings is suspended from hanger equipment in the tubing head. A Christmas tree and related valves and control equipment are installed on top of the stack, and production of oil or gas may then proceed through the tubing string(s).

If it is desired or required simply to plug or cap casing 3, head 1 may be a solid member without a bore 15, or bore 15 may otherwise be sealed, closing off the well from access from above.

It should be understood that although head 1 may be any type of fitting or member, including, for example, a cap as referred to above, a flanged fitting, or a union, and casing 3 may be any type of tubular goods such as, for example, a pipe stub of a chemical or other piping system, a broken pipeline segment, or the like, the present invention has particular utility with respect to installing a casing head on surface casing in the wellhead of an oil or gas well, and for the sake of convenience and clarity the invention will be described primarily with regard to that particular environment.

Figure 2:
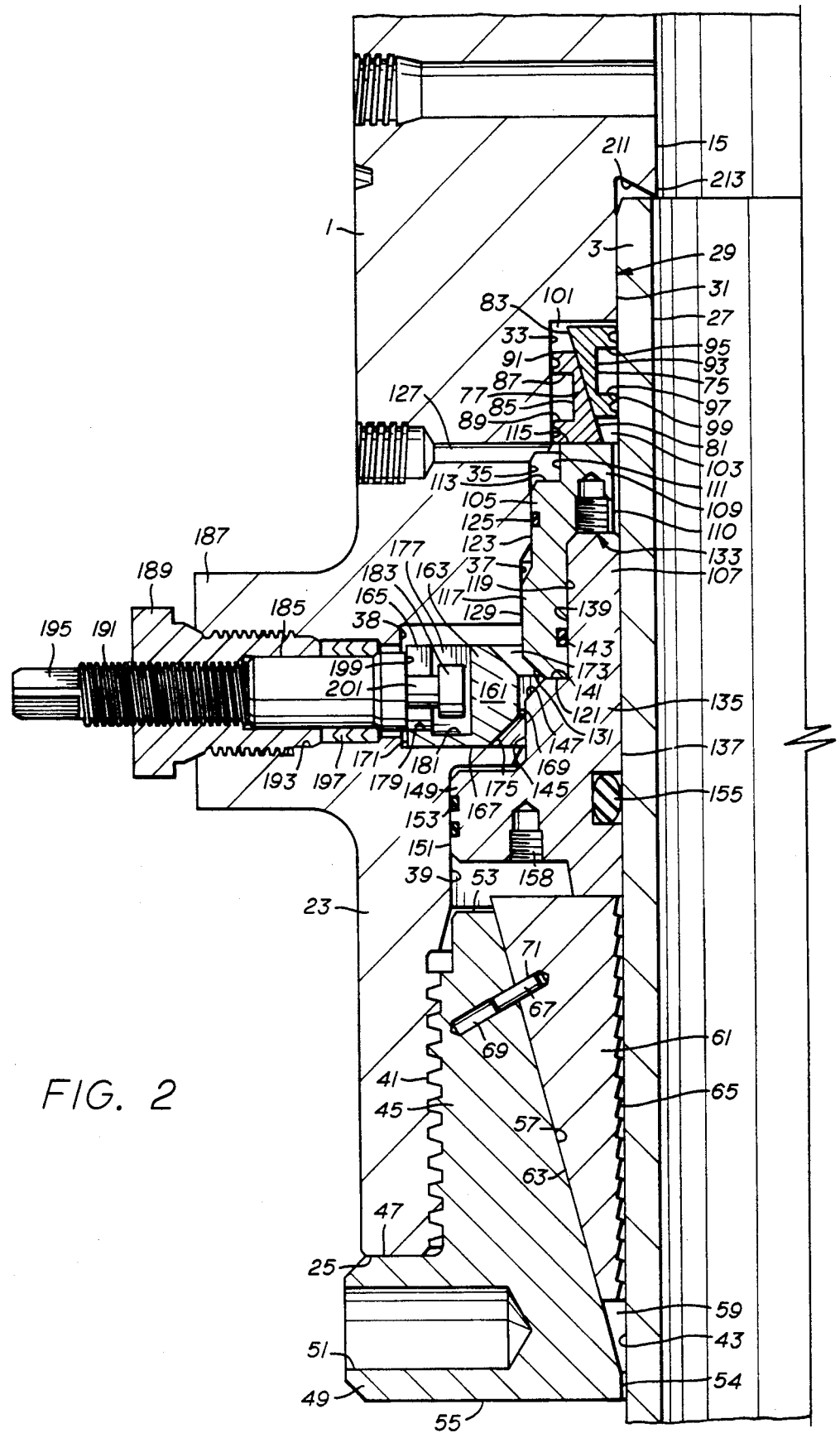
FIG. 2 is an enlarged cross-sectional view of a portion of the wellhead and pipe connector shown in FIG. 1, illustrating the connector prior to energization of the slips and metal seal rings.

Referring now to FIG. 2, there is shown an enlarged cross-sectional view of a portion of the wellhead apparatus shown in FIG. 1, illustrating the pipe connector 21 of the invention in greater detail. Pipe connector 21 is shown in FIG. 2 after the casing head 1 has been lowered onto casing 3, but prior to actuation of the connector 21. Connector 21 includes a main body 23, in this case comprising part of the body of casing head 1, having one terminal end 25 adapted for telescopic insertion over the upper end portion 27 of casing string 3. Main body 23 has a stepped bore 29 surrounding end portion 27 of casing 3, comprising a plurality of counterbores in the lower end of body 23 coaxial with bore 15. Such counterbores include a first counterbore or casing receiving counterbore 31; a larger diameter second counterbore or sealing counterbore 33 below counterbore 31; larger diameter third or upper 35, and still larger diameter fourth or lower 37, upper piston chamber counterbores below counterbore 33; a larger diameter fifth or lock ring segment counterbore 38 below counterbore 37; a smaller diameter sixth or lower piston chamber counterbore 39 below counterbore 38; and a larger diameter seventh or threaded counterbore 41 below counterbore 39, extending through the lower terminal end 25 of main body 23. Counterbore 39 is smaller in diameter than counterbore 38, but larger than counterbore 37. Counterbore 41 is larger in diameter than counterbore 39, but smaller than counterbore 38. Main body 23 is generally tubular and circular cylindrical around end portion 27 of casing 3, and counterbores 33, 35, 37, 38, 39, and 41 form a stepped, circular annular area between the walls of such counterbores and the outside wall 43 of circular, tubular casing 3. It should be understood that the counterbore sizes and relationships of those sizes shown in the drawings and referred to above are illustrative only. For example, and not by way of limitation, counterbore 33 need not be smaller than counterbore 35, and counterbore 41 need not be smaller than counterbore 38. Other modifications of the counterbore sizes will no doubt be apparent to those skilled in the art.

An annular slip retaining nut 45 is threaded into the counterbore 41 until the upper annular surface 47 of radially outwardly extending flange 49 of nut 45 abuts the lower terminal end 25 of main body 23. A pair of diametrically opposed, radially extending blind bores 51 is disposed in the outer side wall of flange 49, adapted for receiving a spanner wrench or the like for removal of nut 45 as described in more detail hereinafter. It should be understood that more or less than two such bores 51 may be provided, as desired. It should also be understood that such bores need not be radially extending. It is sufficient that some means be provided for engaging the nut with a tool or the like for its removal or installation, as desired. Retaining nut 45 substantially closes off the stepped annular area 33, 35, 37, 38, 39 around casing 3.

Around the inside diameter of retaining nut 45, extending from its upper terminal end 53 to the upper end of circular cylindrical bore 54 in nut 45 and nearly to its lower end face 55, there is an upwardly and inwardly facing, downwardly and inwardly tapering frustoconical surface 57. Surface 57 forms a correlatively tapering annular space 59 between the inside surface of retaining nut 45 and the wall 43 of casing 3. A plurality of slip segments 61, e.g., four such segments, are carried by nut 45 in the annular space 59. Slip segments 61 are all of substantially the same size, and are uniformly spaced around casing 3. Slip segments 61 have a tapered surface 63 around their radially outermost peripheries, and a set of casing-gripping teeth 65 around their radially innermost peripheries. Surface 63 is shaped correlatively to surface 57 of nut 45. When main body 23 is first lowered over end portion 27 of casing 3, slips 61 are held in a raised or disengaged position, away from surface 43 of casing 3, by a shear pin 67 disposed in aligning bores, such as blind bores 69, 71, in surface 57 and in each slip segment 61, respectively.

A pair of metal seal rings including an inner seal ring 75 and an outer seal ring 77 is disposed in counterbore 33 around casing 3. The inner circumferential periphery of seal ring 77 comprises an upwardly and inwardly facing, downwardly and inwardly tapering frustoconical surface 81. The outer circumferential periphery of seal ring 75 comprises a downwardly and outwardly facing, downwardly and inwardly tapering frustoconical surface 83 in sliding engagement with surface 81. Surfaces 81, 83 thus comprise correlatively shaped, sliding, interengageable actuating surfaces for seal rings 75, 77. Seal ring 77 has a rectangular profiled, annular groove 85 around its outer circumferential periphery, forming upper and lower sealing ridges 87, 89, respectively, around the upper and lower outer circumferential periphery of seal ring 77. Each sealing ridge 87, 89 has a pair of radially outwardly extending, annular seal lips 91 thereon, in close fitting, sliding relationship to the outer side wall of counterbore 33 prior to energization. Seal ring 75 has a rectangular profiled, annular groove 93 around its inner circumferential periphery, forming upper and lower sealing ridges 95, 97, respectively, around the upper and lower inner circumferential periphery of seal ring 75. Each sealing ridge 95, 97 has a pair of radially inwardly extending, annular seal lips 99 thereon, in close fitting, sliding relationship to the outer wall surface 43 of casing 3 prior to energization. Prior to energization of seal rings 75, 77, seal ring 75 rests partially above ring 77 on surface 81, forming an annular space 101 bounded from above and below by the upper wall surface of counterbore 33 and the upper flat face of seal ring 77, and from the sides by the outer wall surface of counterbore 33 and the upper portion of frustoconical surface 83; and another annular space 103 bounded from above and below by the lower flat face of seal ring 75 and the upper flat face of an upper piston 105, and from the sides by the outer wall surface 43 of casing 3 and the lower portion of frustoconical surface 81. Seal rings 75, 77 may be, for example, of the Canh ™ seal type as offered for sale by the Flow Control Division of Cooper Industries, Inc., of Houston, Tex., the assignee of the present application, and as described in U.S. Pat. No. 4,556,224 of Tri Canh Le, issued Dec. 3, 1985, and now owned by the assignee of the present application. The disclosure of that patent is hereby incorporated herein by reference. It should be understood that seal rings 75, 77 may be reversed, e.g., with seal ring 75 resting atop surface 115 (see below) and seal ring 77 riding above seal ring 75, with the directions of surfaces 81, 83 reversed, while retaining the camming action of the surfaces 81, 83 to energize the seal rings.

A pair of dual-acting, hydraulically actuated annular pistons 105, 107 is disposed in the stepped annular bore area 29 between slips 61 and metal seal rings 75, 77. Upper piston 105 includes an annular body 109 with a central axial bore 110 and a reduced outside diameter portion 111 around its upper outer periphery, forming an annular shoulder 113. The upper terminal end of body 109 comprises an annular flat face 115 in engagement with the flat bottom face of seal ring 77. Bore 110 is larger in diameter than the outside diameter of casing 3. The lower part of upper piston 105 comprises an annular tubular portion or skirt 117 formed by a longitudinally axially extending, enlarged diameter counterbore 119 extending upwardly into the midportion of body 109 from the lower terminal end 121 of piston 105. Body 109 has a circular cylindrical outside wall 123 around its midportion below shoulder 113, and in sliding engagement with the wall of counterbore 35. An elastomer O-ring seal 125 carried in an annular groove around piston 105 in wall 123 provides a sliding seal between piston 105 and counterbore 35. A radially extending test port 127 extends from the outside wall of head 1 into the stepped annular bore 29 at the upper end of counterbore 35 between seal ring 77 and O-ring seal 125. Body 109 also has an enlarged outer diameter, circular cylindrical outside wall portion 129 below wall 123, in sliding engagement with the wall of counterbore 37. Between wall 129 and terminal end 121 of piston 105, the piston has a downwardly and outwardly facing, downwardly and inwardly tapering frustoconical annular surface 131. Body 109 of piston 105 also includes a pair of diametrically opposed, longitudinally axially extending, threaded blind bores 133 in the annular upper end face or shoulder between counterbore 119 and bore 110.

Lower piston 107 includes an annular body 135 with a central axial bore 137 disposed in close fitting, sliding relationship to the outside wall 43 of casing 3. Body 135 of piston 107 has a reduced outside diameter portion 139 around its upper outer periphery, forming an annular shoulder 141. Reduced outside diameter portion 139 is slidingly, telescopically received in a close fitting relationship within counterbore 119 of upper piston 105. In the non-actuated position of pistons 105, 107 illustrated in FIG. 2, lower terminal end 121 of piston 105 rests upon shoulder 141 of piston 107, and the upper terminal end of piston 107 abuts the shoulder between counterbore 119 and bore 110 of piston 105. An elastomer O-ring 143 or the like is housed in an annular groove around the wall of counterbore 119 for establishing a sliding seal between pistons 105, 107.

Body 135 of piston 107 includes a midportion having a circular cylindrical outer wall 145 with about the same outer diameter as the diameter of counterbore 37. Between the upper end of outer wall 145 and shoulder 141, body 135 of piston 107 includes an upwardly and outwardly facing, upwardly and inwardly tapering frustoconical surface 147 which meets surface 131 of upper piston 105 at their radially innermost edges prior to actuation of pistons 105, 107. Below midportion 145, body 135 has an enlarged outer diameter annular flange 149 with a circular cylindrical outer wall 151 in close fitting, sliding relationship to the wall of counterbore 39. Flange 149 carries a pair of O-ring seal elements 153 or the like in annular grooves in wall 151 around the outer periphery of flange 149 for providing sliding sealing engagement with the wall of counterbore 39. Body 135 also carries an elastomer seal element 155 in an annular groove around the inner circumferential periphery of body 135 for establishing a sliding seal between piston 107 and casing 3. Flange 149 also includes a pair of diametrically opposed, longitudinally axially extending, threaded blind bores 158 in its lower face.

Figure 4:
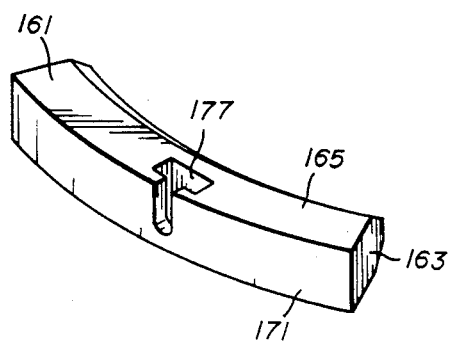
FIG. 4 is an isometric view of one of the lock ring segments of the present invention.

A plurality, e.g. four, of lock ring segments 161 are disposed in counterbore 38 around the lower end portion of upper piston 105 and the midportion of lower piston 107. Lock ring segments 161 are all of substantially the same shape and size, and are uniformly spaced around pistons 105, 107. Lock ring segments 161, as shown in FIG. 2 in the non-actuated position and in FIG. 3 in the actuated position, and also as shown pictorially in FIG. 4, include an arcuate body 163 with flat upper and lower faces 165, 167, respectively. The radially innermost and outermost surfaces of lock ring segments 161 comprise circular cylindrical-shaped wall segments 169, 171, respectively. Lock ring segments 161 have along their upper inner peripheries, between the upper edge of wall 169 and the upper face 165, an upwardly and inwardly facing, downwardly and inwardly tapering surface 173. Lock ring segments 161 also have along their lower inner peripheries a downwardly and inwardly facing, upwardly and inwardly tapering surface 175. A T-shaped slot 177 extends transversely into the body 163 of each lock ring segment 161 from its upper face 165. Slot 177 has a narrow throat 179 and an enlarged bowl 181 for retaining the head 183 of a lockdown screw 185, as hereinafter described. Lock ring segments 161 are shorter in height from their upper faces 165 to their lower faces 167 than the height of counterbore 38, so that the lock ring segments have up-and-down or longitudinal axial "play" in counterbore 38. Lock ring segments 161 are also free to move radially inwardly and outwardly to a limited extent in order to move into or out of actuation against pistons 105, 107.

Lock ring segments 161 are actuated by a plurality of lockdown screws 185 mounted in outwardly extending threaded bosses 187 which are circumferentially spaced apart about the periphery of casing head 1. Instead of bosses 187, an annular flange or arcuate flange portions or the like may be provided around casing head 1 for receiving lockdown screws 185, or, if the casing head were thick walled enough, the lockdown screws may be simply threaded into the casing head wall. Preferably, there will be one lockdown screw 185 for each lock ring segment 161. It is also preferred that each lockdown screw 185 engage the corresponding lock ring segment 161 in its center, for uniform actuation and release. Lockdown screws 185 each include a gland nut 189 threadedly secured in its respective boss 187 or other mounting means, and a stem 191 threadedly received in the central bore of gland nut 189 and in a radially extending bore 193 in head 1. Stem 191 is radially movable into or out of gland nut 189 and bore 193 by gripping flats 195 with an appropriate tool and rotating stem 191 clockwise or counterclockwise, as the case may be. Stem 191 is sealed against casing head 1 by an appropriate packing 197. Stem 191 has an annular abutment shoulder 199 adapted for engaging the outer wall surface 171 of the respective lock ring segment 161 for forcing it radially inwardly during actuation. Stem 191 includes a reduced diameter neck 201 extending between shoulder 199 and head 183 and received in throat 179 of slot 177. Head 183 of stem 191 is received in bowl 181 of slot 177, and is larger in diameter than throat 179 so that when stem 191 is backed out of gland nut 189, head 183 engages the radially outermost wall of bowl 181 and pulls the lock ring segment 161 radially outwardly along with it. Thus, lockdown screws 185 are used to both actuate and release the lock ring segments 161.

In operation, after the surface casing 3 has been installed and cut off, head 1 is lowered over the upper end portion 27 of the casing and onto the landing base 5. The apparatus will then be in the position shown in FIG. 2, with slips 61 in their upper, disengaged positions, seal rings 75, 77 not yet actuated, pistons 105, 107 fully telescoped together, and lock ring segments 161 and lockdown screws 185 in their radially outer, released positions. Highly pressurized fluid is then introduced into counterbore 38 between pistons 105, 107 through one or more radially extending pressure ports (not shown) in casing head 1, forcing the pistons 105, 107 apart. Upper piston 105 is forced upwardly against seal ring 77, pressing it upwardly, further into counterbore 33. When seal ring 77 is so forced upwardly by piston 105, the sliding engagement between surfaces 81, 83 forces seal ring 77 radially outwardly into metal-to-metal sealing engagement with the wall of counterbore 33, and seal ring 75 radially inwardly into metal-to-metal sealing engagement with casing 3. Seal lips 91, 99 coin into sealing engagement with such counterbore wall and casing wall, respectively, and along with the tight engagement of surfaces 81, 83 with respect to each other form a pressure-tight metal-to-metal seal between casing head 1 and surface casing 3. It should be noted that port 127 should be open during upward actuation of piston 105 in order to permit any fluids to be expelled from on top of piston 105 as it moves upwardly in chamber or counterbore 35.

Figure 3:
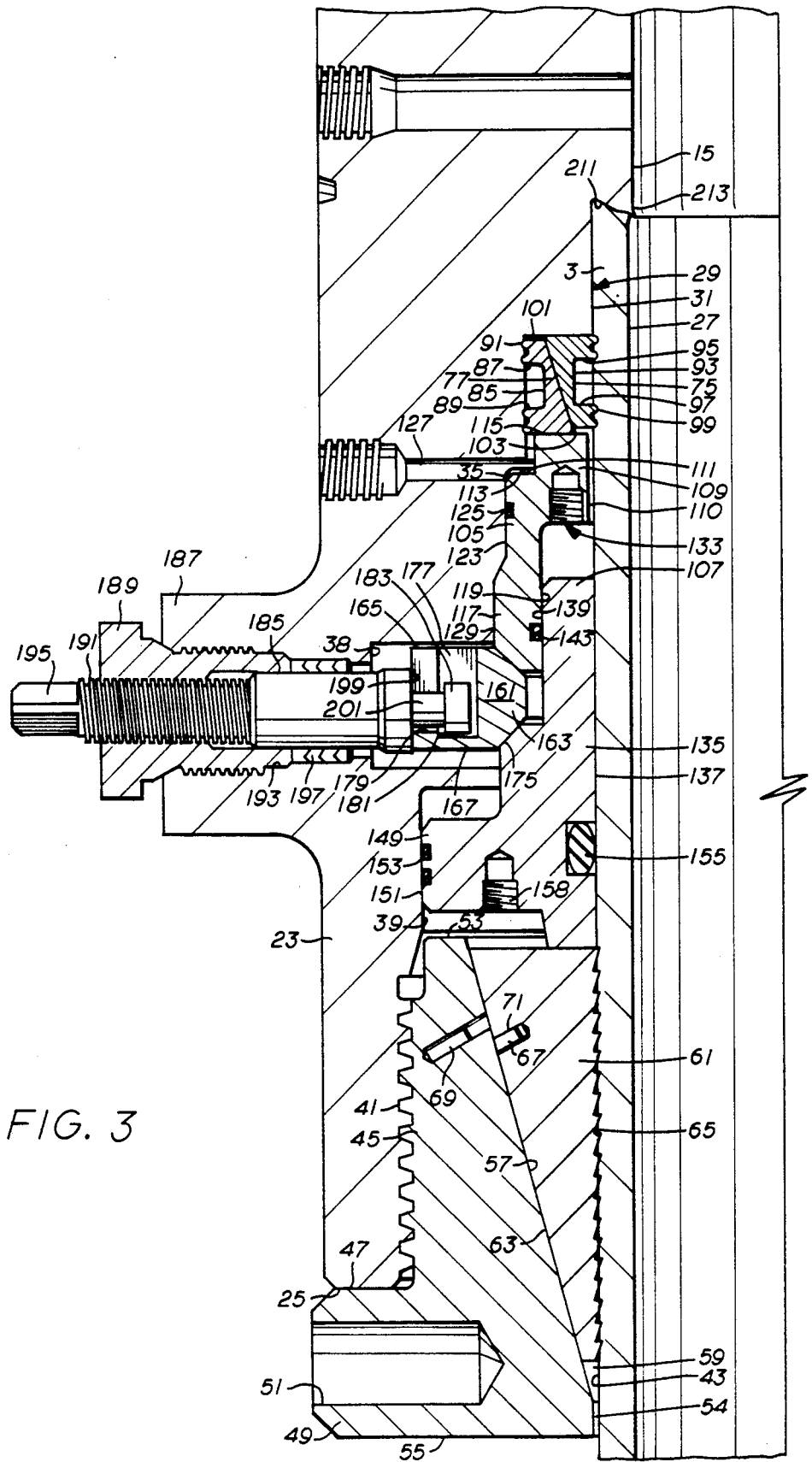
FIG. 3 is an enlarged cross-sectional view of a portion of the pipe connector shown in FIG. 1, illustrating the connector after energization of the slips and metal seal rings and actuation of the lock ring segments.

As piston 105 moves upwardly to energize seal rings 75, 77, piston 107 is forced downwardly against the upper terminal ends of slips 61. Pins 67 are sheared, and as slips 61 are forced downwardly they are also forced inwardly by tapered surfaces 57, 63, so that teeth 65 bite into casing 3 and grip it securely. Lockdown screws 185 are then tightened, forcing lock ring segments 161 radially inwardly into wedging relationship between surfaces 131, 147 of upper piston 105 and lower piston 107, respectively. Surface 173 of lock ring segment 161 engages surface 131 of upper piston 105, and surface 175 of lock ring segment 161 engages surface 147 of lower piston 107, tending to force upper piston 105 upwardly and lower piston 107 downwardly further into engagement with seal rings 75, 77 and slips 61, respectively. Lock ring segments 161 with their wedging action prevent pistons 105, 107 from backing out of energizing or actuating engagement with the metal seal rings or slips, and thereby serve as mechanical backups for the hydraulic energization and actuation provided by pistons 105, 107. Thus, should hydraulic pressure fail or otherwise be released, the seals and slips will remain actuated. It should be noted that since lock ring segments 161 are free to float up or down in counterbore 38, they will be self-centering between pistons 105, 107 when actuated, i.e., they will move up or down when engaging surfaces 131, 147 so that stresses in the upward and downward direction will tend to equalize. Upon complete actuation of the lockdown screws 185, the apparatus of the present invention will appear as shown in FIG. 3.

In the event that either or both of the seal rings 75, 77 and slips 61 become loose or lose some of their energization, they can be re-energized by re-pressuring with additional highly pressurized fluid applied between the pistons, and re-tightening the lockdown screws.

In the event it is desired to remove head 1 from casing 3, for example to use the head on another well, the well is killed and hydraulic pressure to the pistons released, if not released previously. Lockdown screws 185 are backed out, pulling the lock ring segments 161 out with them, away from pistons 105, 107. Lock ring segments 161 are pulled away from pistons 105, 107 a distance sufficient to create a radial clearance between such segments and the outer wall of midportion 145 of lower piston 107, and wall 129 of upper piston 105. Casing 3 is burned or cut off, usually below landing base 5, and the entire assembly above the cut is lifted off and away from the well. The landing base 5 drops off, and a spanner wrench or the like is used to engage bores 51 in nut 45 to unscrew the nut from the end of the head. Slips 61 drop out and away from casing 3 with nut 45. Lower piston 107 is pulled out of head 1 through engagement of bores 158 with an appropriate tool, and upper piston 105 is similarly engaged in bores 133 by an appropriate tool and pulled out of the head. Canh seals 75, 77 are extracted, and the casing stub 3 removed from the head. The connector and head of the present invention may then be refurbished, including replacement as needed of Canh seal rings 75, 77, elastomer seal members 125, 143, 153, 155, and slips 61, for reassembly and reinstallation on another pipe or casing.

Figure 5A:
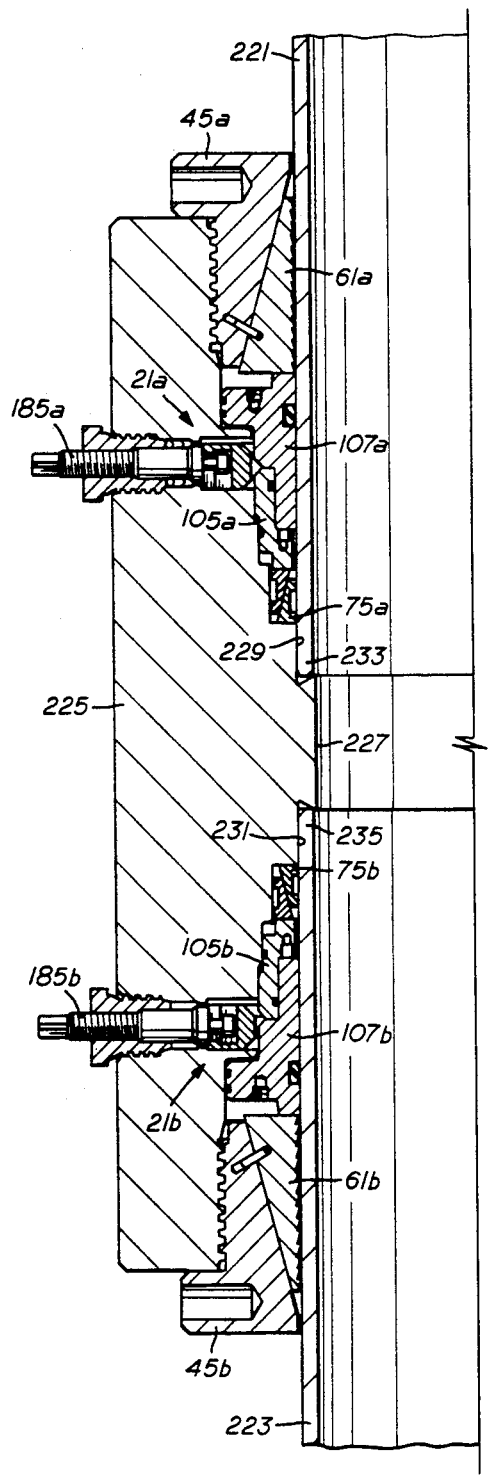
FIG. 5A is a fragmentary vertical cross-sectional view of a portion of a pipe connector of the present invention used for connecting together two pipe ends to form a union, with the connector installed on the pipe ends but prior to energization of the slips and metal seal rings.
Figure 5B:
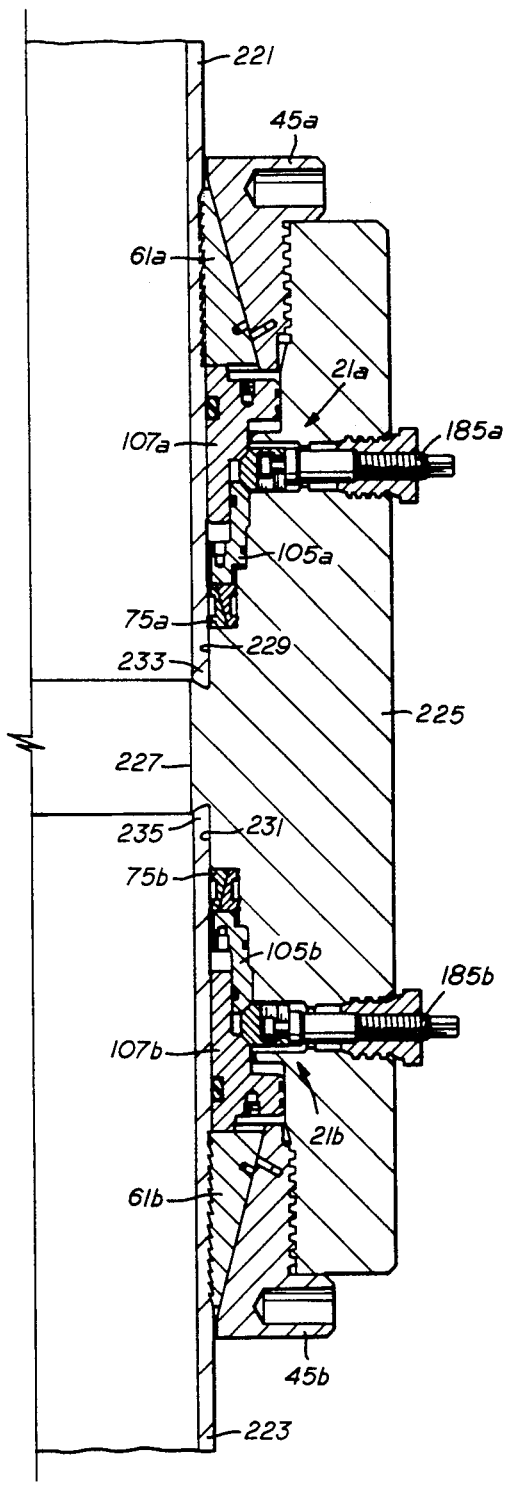
FIG. 5B is a fragmentary vertical cross-sectional view of a portion of a pipe connector of the present invention similar to FIG. 5A, after energization of the slips and metal seal rings.

It should be understood that if the connector of the present invention were to be used, for example, as a union between two pipe ends, such as shown in FIGS. 5A and 5B, or in another situation where there is no member such as landing base 5 which is backed up against the outer or free end of the slip retaining nut, then usually it will not be necessary to cut the pipe and remove the cut pipe segment, with connector attached, away from the rest of the pipe in order to back off the nut 45 and release the slips. In a situation such as this, it will usually be possible to back off the nut or nuts, release and extract the slips, remove the other components of the connector of the invention, and pull the pipe ends from the main body while in the field, without cutting the pipe first.

In order to prevent inward collapse of casing 3 when it is subjected to high compressive loading, main body 23 of casing head 1 includes a downwardly and outwardly facing, downwardly and inwardly tapering frustoconical annular shoulder 211 at the upper end of the stepped annular bore area 29, i.e., at the upper end of counterbore 31. The inner peripheral edge 213 of shoulder 211 engages the upper, inner peripheral edge of casing 3 around its circumference when head 1 is installed on casing 3. When high compressive loading of casing 3 occurs, for example during drilling operations with the weight of the blowout preventer stack on top of the head or when additional casing strings are installed and supported in the wellhead on top of the head, the shoulder 211 deforms plastically, flattening out somewhat and with inner edge 213 flowing partially into bore 15. Casing 3 will tend to flow into the space between the face of shoulder 211 and the top of the casing, which space decreases as the shoulder flattens out. This deformation of shoulder 211 pushes radially outwardly on the upper inner edge of casing 3 to resist inward collapse of the casing.

Referring now to FIGS. 5A and 5B, there is shown in vertical cross-sectional views a connector of the present invention being used as a union to connect together the free ends of two pipes or pipe segments 221, 223. FIG. 5A shows the connectors 21a, 21b prior to actuation, and FIG. 5B, after actuation. In this embodiment of the invention, the connector comprises a tubular cylindrical main body 225 having a central axial bore 227 and stepped bores 229, 231 extending axially from each end for receiving the pipe ends 233, 235 and connector elements 21a, 21b, respectively, therewithin. Each of the connector elements 21a, 21b is like that shown at 21 in FIGS. 1–4 and described above, so they need not be described further here. Some of the parts of connector elements 21a, 21b have been labeled with reference numerals corresponding to those for like parts of connector 21, with the addition of an "a" or a "b," for ease of reference. When actuated, each of connector elements 21a, 21b securely retains the respective pipe ends 233, 235 in main body 225, in sealed relation thereto.

While preferred embodiments of the invention have been shown and described, many modifications thereof may be made by those skilled in the art without departing from the spirit of the invention. Therefore, the scope of the invention should be determined in accordance with the following claims.

We claim:

1. A connector for attaching a body to the end of a pipe, comprising:
   a main body having a bore in one end adapted for telescopic insertion over the end of the pipe, forming an annular bore area between the outside wall of the pipe and the wall of the bore;
   slip means disposed around the pipe in said annular bore area and carried on said main body, movable from a non-actuated position out of engagement with the pipe to an actuated position in gripping engagement with the pipe;

seal means disposed around the pipe in said annular bore area for sealingly engaging said outside wall of said pipe and said bore wall;

dual-acting hydraulic piston means disposed around the pipe in said annular bore area between said slip means and said seal means and having a first actuating portion movable in one direction into energizing engagement with said seal means and a second actuating portion movable in the opposite direction into actuating engagement with said slip means upon application of pressurized fluid to said piston means; and radially reciprocable means for releasably engaging said first and second actuating portions of said piston means when said first actuating portion is in energizing engagement with said seal means and said second actuating portion is in actuating engagement with said slip means;

said releasably engaging means comprising a plurality of lock ring segments disposed around said dual-acting hydraulic piston means in said annular bore area, said lock ring segments being adapted for moving radially inwardly and into mechanical backup engagement with said first and second actuating portions of said piston means when said piston means has been actuated, substantially preventing said first actuating portion from moving in said opposite direction out of energizing engagement with said seal means and said second actuating portion from moving in said one direction out of actuating engagement with said slip means, and being adapted for moving radially outwardly and out of mechanical backup engagement with said first and second actuating portions, allowing said first actuating portion to move in said opposite direction out of energizing engagement with said seal means and allowing said second actuating portion to move in said one direction out of actuating engagement with said slip means;

said dual-acting hydraulic piston means including an upper piston comprising said first actuating portion and a lower piston comprising said second actuating portion, said upper piston having a bore in its lower end, said lower piston being slidingly telescopingly received in said bore of said upper piston, and said upper piston including a downwardly and outwardly facing camming surface and said lower piston including an upwardly and outwardly facing camming surface, and each of said lock ring segments including an upwardly and inwardly facing camming surface along its upper inner periphery and a downwardly and inwardly facing camming surface along its lower inner periphery, said upper camming surfaces of said lock ring segments engaging said camming surface of said upper piston and said lower camming surfaces of said lock ring segments engaging said camming surface of said lower piston when said lock ring segments are moved radially inwardly.

2. A connector according to claim 1, wherein said seal means is disposed in the upper end of said annular bore area and said slip means is disposed in the lower end of said annular bore area, said upper piston having an upper end face in engagement with said seal means and said lower piston having a lower end face in engagement with said slip means, said lower piston having an annular shoulder around its midportion upon which the lower end of said upper piston rests in the non-actuated position, and said annular bore area of said main body having an enlarged counterbore disposed around said lower end of said upper piston and said midportion of said lower piston for receiving said pressurized fluid, said upper piston being sealingly received in said annular bore area above said enlarged counterbore and said lower piston being sealingly received in said annular bore area below said enlarged counterbore, said lower piston being sealed with respect to said bore of said upper piston, whereby upon application of said pressurized hydraulic fluid, said upper piston moves upwardly into energizing engagement with said seal means and said lower piston moves downwardly into actuating engagement with said slip means.

3. A connector for attaching a body to the end of a pipe, comprising:

a main body having a bore in one end adapted for telescopic insertion over the end of the pipe, forming an annular bore area between the outside wall of the pipe and the wall of the bore;

slip means disposed around the pipe in said annular bore area and carried on said main body, movable from a non-actuated position out of engagement with the pipe to an actuated position in gripping engagement with the pipe;

seal means disposed around the pipe in said annular bore area for sealingly engaging said outside wall of said pipe and said bore wall;

dual-acting hydraulic piston means disposed around the pipe in said annular bore area between said slip means and said seal means and having a first actuating portion movable in one direction into energizing engagement with said seal means and a second actuating portion movable in the opposite direction into actuating engagement with said slip means upon application of pressurized fluid to said piston means, said dual-acting hydraulic piston means including an upper piston comprising said first actuating portion and a lower piston comprising said second actuating portion, said upper piston having a bore in its lower end and said lower piston being slidingly telescopingly received in said bore of said upper piston;

wherein said seal means is disposed in the upper end of said annular bore area and said slip means is disposed in the lower end of said annular bore area, said upper piston having an upper end face in engagement with said seal means and said lower piston having a lower end face in engagement with said slip means, said lower piston having an annular shoulder around its midportion upon which the lower end of said upper piston rests in the non-actuated position, and said annular bore area of said main body having an enlarged counterbore disposed around said lower end of said upper piston and said midportion of said lower piston for receiving said pressurized fluid, said upper piston being sealingly received in said annular bore area above said enlarged counterbore and said lower piston being sealingly received in said annular bore area below said enlarged counterbore, said lower piston being sealed with respect to said bore of said upper piston, whereby upon application of said pressurized hydraulic fluid, said upper piston moves upwardly into energizing engagement with said seal means and said lower piston moves downwardly into actuating engagement with said slip means; and mechanical backup means disposed in said enlarged counterbore around said lower end of said upper piston and said midportion of said lower piston for moving into mechanical backup engagement with said upper and lower pistons when said upper and lower pistons have been actuated, substantially preventing downward movement of said upper piston and upward movement of said lower piston; wherein said lower end of said upper piston has a downwardly and outwardly facing camming surface around its outer periphery and said annular shoulder of said lower piston has an upwardly and outwardly facing camming surface around its outer periphery, and said mechanical backup means includes a plurality of lock ring segments circumferentially spaced apart in said enlarged counterbore, each of said lock ring segments including an upper, upwardly and inwardly facing camming surface along its upper inner periphery and a lower, downwardly and inwardly facing camming surface along its lower inner periphery, said upper camming surfaces of said lock ring segments engaging said camming surface of said upper piston and said lower camming surfaces of said lock ring segments engaging said camming surface of said lower piston when said lock ring segments have been actuated, whereby said upper piston is cammed upwardly and said lower piston is cammed downwardly by said lock ring segments.

4. A connector according to claim 3, wherein said enlarged counterbore is greater in height than said lock ring segments, said lock ring segments being free to move upwardly or downwardly to a limited extent in said enlarged counterbore when actuated, thereby effecting self-centering of said lock ring segments with respect to said upper and lower pistons when the respective ones of said camming surfaces are engaged with one another.

5. A connector according to claim 3, wherein there is included, for each of said lock ring segments, lockdown means disposed on said main body and engageable with said lock ring segments for moving said lock ring segments into engagement with said upper and lower pistons and actuating said camming surfaces.

6. A connector according to claim 5, wherein each of said lockdown means includes means engageable with the respective ones of said lock ring segments for retracting said lock ring segments away from camming engagement with said upper and lower pistons.

7. A connector according to claim 6, wherein each of said lockdown means includes a lockdown screw threadedly received in a transverse bore in said main body and having an annular shoulder engageable with the outer side of the respective lock ring segment for moving it radially inwardly and a T-shaped head slidingly received in a correlatively shaped slot in the lock ring segment for moving it radially outwardly when the lockdown screw is screwed into or out of said main body, respectively.

8. A connector according to claim 3, and including a retaining nut threadedly received in said one end of said main body in said annular bore area around the pipe, and having a tapered slip actuating surface around its inner periphery forming a tapered annular area between said tapered slip actuating surface and the pipe, said slip means including a plurality of slip segments disposed in said tapered annular area and circumferentially spaced apart about the pipe.

9. A connector according to claim 8, wherein each of said slip segments includes a pipe gripping serrated surface on its inner side and a tapered surface shaped correlatively to said slip actuating surface of said nut on its outer side, and including shear means disposed between said tapered surfaces of said slip segments and said slip actuating surface for holding said slip segments in said non-actuated position prior to actuation of said slip means by said dual-acting hydraulic piston means.

10. A connector according to claim 9, and further including means for extracting said dual-acting hydraulic piston means from said annular bore area when said retaining nut and said slip segments have been removed from said one end of said main body.

11. A connector according to claim 3, wherein said seal means forms a metal-to-metal seal between the pipe and the wall of the annular bore area when energized by said hydraulic piston means.

12. A connector according to claim 3, and further including means disposed around the inner end of said bore in engagement with the end of the pipe for preventing radially inward collapse of the pipe due to application of high compressive loads thereon.

13. A connector according to claim 12, wherein said means for preventing inward collapse of said pipe end includes a downwardly and outwardly facing, downwardly and inwardly tapering frustoconical shoulder around said bore of said main body, the inner peripheral edge of said frustoconical shoulder engaging the upper, inner periphery of said pipe end under normal operating conditions, said frustoconical shoulder being adapted to partially flatten out and its inner peripheral edge being adapted to deform plastically and flow radially inwardly somewhat upon application of a high compressive load on said main body at said frustoconical shoulder.

14. A connector for attaching a body to the end of a pipe, comprising:
a main body having a bore in one end adapted for telescopic insertion over the end of the pipe, forming an annular bore area between the outside wall of the pipe and the wall of the bore;
slip means disposed around the pipe in said annular bore area and carried on said main body, movable from a non-actuated position out of engagement with the pipe to an actuated position in gripping engagement with the pipe;
seal means disposed around the pipe in said annular bore area for sealingly engaging said outside wall of said pipe and said bore wall;
dual-acting hydraulic piston means disposed around the pipe in said annular bore area between said slip means and said seal means and having a first actuating portion movable in one direction into energizing engagement with said seal means and a second actuating portion movable in the opposite direction into actuating engagement with said slip means upon application of pressurized fluid to said piston means, said dual-acting hydraulic piston means including an upper piston comprising said first actuating portion and a lower piston comprising said second actuating portion, said upper piston having a bore in its lower end and said lower piston being slidingly telescopingly received in said bore of said upper piston;

wherein said seal means is disposed in the upper end of said annular bore area and said slip means is disposed in the lower end of said annular bore area, said upper piston having an upper end face in engagement with said seal means and said lower piston having a lower end face in engagement with said slip means, said lower piston having an annular shoulder around its midportion upon which the lower end of said upper piston rests in the non-actuated position, and said annular bore area of said main body having an enlarged counterbore disposed around said lower end of said upper piston and said midportion of said lower piston for receiving said pressurized fluid, said upper piston being sealingly received in said annular bore area above said enlarged counterbore and said lower piston being sealingly received in said annular bore area below said enlarged counterbore, said lower piston being sealed with respect to said bore of said upper piston, whereby upon application of said pressurized hydraulic fluid, said upper piston moves upwardly into energizing engagement with said seal means and said lower piston moves downwardly into actuating engagement with said slip means; and wherein said slip means is carried on a nut threadedly received in said one end of said main body, wherein said bore of said upper piston has an annular shoulder therein, and wherein said shoulder of said bore of said upper piston and a lower end face of said lower piston each include a threaded blind bore adapted to receive an extracting tool for removing said lower and upper pistons from said annular bore area when said nut is unthreaded from said main body.

15. A connector according to claim 14, and further including mechanical backup means disposed in said enlarged counterbore around said lower end of said upper piston and said midportion of said lower piston for moving into mechanical backup engagement with said upper and lower pistons when said upper and lower pistons have been actuated, substantially preventing downward movement of said upper piston and upward movement of said lower piston.

16. A connector for attaching a body to the end of a pipe, comprising:
a main body having a bore in one end adapted for telescopic insertion over the end of the pipe, forming an annular bore area between the outside wall of the pipe and the wall of the bore;
a nut threadedly received in said one end of said main body in said annular bore area, said nut having a tapered slip retaining and actuating surface around its inner periphery;
a plurality of slip segments disposed on said slip retaining and actuating surface and circumferentially spaced apart about the pipe, said slip segments being movable from a first position supported away from said pipe by shear pins disposed between said slip segments and said nut to a second position in gripping engagement with the pipe;
a pair of metal seal rings disposed around the pipe in the end of said annular bore area opposite from said slips for forming a metal-to-metal seal between said main body and the pipe when energized;
an upper piston slidingly and sealingly disposed in said annular bore area between said metal seal rings and said slips and movable by application of pressurized fluid to said upper piston into energizing engagement with said metal seal rings, said upper piston including a lower end having a downwardly and outwardly facing camming surface around its outer periphery;
a lower piston slidingly and sealingly disposed in said annular bore area between said upper piston and said slip segments and movable by application of said pressurized fluid to said lower piston into actuating engagement with said slip segments, shearing said shear pins and moving said slip segments into said second position, said lower piston including an annular shoulder having an upwardly and outwardly facing camming surface around its outer periphery;
a plurality of lock ring segments disposed in said annular bore area and circumferentially spaced apart around said upper and lower pistons, each of said lock ring segments including an upper, upwardly and inwardly facing camming surface along its upper inner periphery and a lower, downwardly and inwardly facing camming surface along its lower inner periphery, said lock ring segments being movable radially inwardly and outwardly to move into or out of, respectively, wedging engagement with said pistons, said lock ring segments when in wedging engagement with said pistons preventing said upper piston from moving out of energizing engagement with said metal seal rings and preventing said lower piston from moving away from actuating engagement with said slip segments; and
lockdown means disposed in and circumferentially spaced about said main body and extending into said annular bore area for engaging said lock ring segments and for actuating said lock ring segments radially inwardly and outwardly into and out of wedging engagement with said pistons.

17. A connector according to claim 16, and further including a threaded blind bore formed in said lower piston and a threaded blind bore formed in said upper piston, said bores adapted to receive an extracting tool for removing said lower and upper pistons from said annular bore area when said nut is unthreaded from said main body.

18. A connector according to claim 17, and including a port communicating said annular bore area between said upper piston and said metal seal rings to the outside of said main body.

19. A connector according to claim 16, wherein said metal seal rings comprise a pair of Canh seal rings.

* * * * *

UNITED STATES PATENT AND TRADEMARK OFFICE
CERTIFICATE OF CORRECTION

PATENT NO. : 5,158,326

DATED : October 27, 1992

INVENTOR(S) : Alfred L. Anderson, Christopher G. Sanchez and Michael L. Dyer

It is certified that error appears in the above—identified patent and that said Letters Patent is hereby corrected as shown below:

On the title page:

(75) Inventors: After "Houston," delete "both" and insert --Michael L. Dyer, Houston, all--.

Signed and Sealed this

Twenty-third Day of November, 1993

Attest:

BRUCE LEHMAN

Attesting Officer

Commissioner of Patents and Trademarks